United States Patent [19]

Benedikt et al.

[11] Patent Number: 4,680,380

[45] Date of Patent: Jul. 14, 1987

[54] ODOR-FREE CHLOROSULFONATED POLYOLEFINS

[75] Inventors: George M. Benedikt, Lakewood; Dennis A. Barnes, Brunswick, both of Ohio

[73] Assignee: The B. F. Goodrich Company, Akron, Ohio

[21] Appl. No.: 459,066

[22] Filed: Jan. 19, 1983

[51] Int. Cl.$^4$ .......................... C08K 3/32; C08K 3/26; C08K 3/22

[52] U.S. Cl. .................................. 528/485; 525/344; 528/487; 528/488

[58] Field of Search ................ 528/480, 487, 485, 488

[56] References Cited

U.S. PATENT DOCUMENTS 3,168,499  2/1965  Orthner .............................. 528/489
3,624,054  11/1971  Barton ................................. 525/344

Primary Examiner—Christopher A. Henderson
Attorney, Agent, or Firm—J. Hughes Powell, Jr.; Nestor W. Shust

[57] ABSTRACT

Vapor phase chlorosulfonated polyolefins usually contain as much as about 100 to 200 parts of more per million of sulfur dioxide in the chlorosulfonated polyolefin particles, even after degassing, that is released over a period of time. The amount of sulfur dioxide released from vapor phase chlorosulfonated polyolefins can be reduced to an amount of less than 0.5 ppm of sulfur dioxide in air, below the level that it can be detected by odor, when there is mixed with the powdered chlorosulfonated polyolefin, after the chlorosulfonation reaction and purging to reduce the sulfur dioxide content of the powder to less than about 300 ppm, less than about three weight parts per one hundred weight parts of chlorosulfonated powdered polyolefin of an inorganic material, or mixture thereof, selected from the group consisting of aluminum hydroxide, barium carbonate, barium hydroxide, magnesium hydroxide, magnesium oxide, potassium carbonate, dipotassium hydrogen phosphate, tripotassium phosphate, sodium carbonate, disodium hydrogen phosphate and trisodium phosphate.

16 Claims, No Drawings

ODOR-FREE CHLOROSULFONATED POLYOLEFINS

BACKGROUND OF THE INVENTION

Chlorosulfonated polyethylene elastomers are prepared commercially by dissolving polyethylene in a solvent such as carbon tetrachloride, along with a catalyst, and bubbling chlorine and sulfur dioxide therethrough to obtain polymers normally containing 20 to 40 percent chlorine and about 1 to 2 percent sulfur. The chlorosulfonated polyethylene is then isolated from the reaction media and dried. These polymers normally are substantially free of $SO_2$. In a promising method for chlorosulfonating polyolefins that does not have some of the problems encountered with solution methods, such as the large volumes of liquid material that must be handled, problems of recovering and recycling toxic solvents; powdered polyolefins are chlorosulfonated with a mixture of chlorine and sulfur dioxide in the vapor phase, preferably in a fluidized bed. While this has been successfully achieved, some difficulty has been experienced in removing all of the residual sulfur dioxide from the resulting chlorosulfonated polyolefin powder, even after prolonged purging or degassing of the chlorosulfonated polymers at elevated temperatures. It has been found that these chlorosulfonated polyolefins, after packaging, still release objectionable amounts of sulfur dioxide gas in the packages. A method is needed to reduce release of free sulfur dioxide from sulfur dioxide containing vapor phase chlorosulfonated polyolefins, either while packaged, or thereafter, and eliminates the sulfur dioxide odor.

SUMMARY OF THE INVENTION

Vapor phase chlorosulfonated polyolefins usually contain as much as about 100 to 200 parts or more per million of sulfur dioxide in the chlorosulfonated polyolefin particles, even after degassing, that is released over a period of time. The amount of sulfur dioxide released from vapor phase chlorosulfonated polyolefins can be reduced to an amount of less than 0.5 ppm of sulfur dioxide in air, below the level that it can be detected by odor, when there is mixed with the powdered chlorosulfonated polyolefin, after the chlorosulfonation reaction and purging to reduce the sulfur dioxide content of the powder to less than about 300 ppm, less than about three weight parts per one hundred weight parts of chlorosulfonated powdered polyolefin of an inorganic material, or mixture thereof, selected from the group consisting of aluminum hydroxide, barium carbonate, barium hydroxide, magnesium hydroxide, magnesium oxide, potassium carbonate, dipotassium hydrogen phosphate, tripotassium phosphate, sodium carbonate, disodium hydrogen phosphate and trisodium phosphate.

DETAILED DESCRIPTION

Any polyolefin can be used to make the vapor phase chlorosulfonated polyolefin, including low and high density, linear and branched, polyolefins made by high and low pressure processes and with a variety of catalysts. The polyolefin used may have a molecular weight from about 20,000 to several million, usually from about 50,000 to 200,000. Polyethylenes are preferred materials with melt indexes that range from 0.01 to less than 30, preferably from 0.2 to 18. The density of the polyethylene may be from about 0.90 to 0.97, preferably 0.93 to 0.965, and the crystalline melting point from about 100° C. to 140° C., preferably 120° C. to 136° C. The particle size will range from greater than 50, preferably greater than 75 to less than 800 microns, preferably 100 microns to less than 600 microns. It is preferred that the chlorosulfonated polyethylenes have a narrow range of average particle sizes no greater than about 200 microns, based on the average particle size. The term polyethylene is understood to include copolymers of ethylene with other alpha olefins, preferably containing 3 to 6 carbon atoms and in amounts less than 10 weight percent, for example, 5% butene-1. Other polyolefins include polypropylene, polybutene-1, copolymers of ethylene and vinyl acetate and the like.

Chlorosulfonated polyolefins may be prepared by a number of vapor phase processes. British Patent Specification No. 815,234, discloses treatment of polyethylene of a particle size not greater than 0.25 mm with a gaseous mixture of chlorine and sulfur dioxide at a temperature not substantially above 100° C., preferably at 40°–80° C. The ratio of sulfur dioxide to chlorine used is in a mol ratio of 1:1 and 2:1, and the resulting polymers have sulfur contents as high as 10% and chlorine contents as high as about 20% by weight.

U.S. Pat. No. 3,258,445, describes a process for chlorosulfonating polyolefins in finely divided form in the presence of quaternary ammonium salts or tertiary amines at a temperature which is above or equal to the starting temperature of the endothermal fusion phenomenon characteristic of the polymer treated. This process is conducted in two stages, in a first stage at a temperature below the lower temperature limit of the melting range of the polymer, then adding the quarternary ammonium salt or amine and raising the temperature as high as the lower temperature limit of the melting range of the polymer, and adding a mixture of chlorine and sulfur dioxide.

Another fluid bed process for chlorosulfonating polyethylene is described in U.S. Pat. No. 2,928,819, wherein the use of 50% or more by weight of magnesia, aluminum sulfate, sodium chloride and the like is proposed.

In another method, hereinafter referred to as the fourth method, finely divided polyethylene is chlorosulfonated with chlorine and sulfure dioxide in vapor phase in the presence of actinic light, optionally, and of 1 to 10 weight parts, per 100 weight parts polyethylene, of an inorganic compound inert under free radical reaction conditions and having a dielectric constant of greater than about 40, and a specific conductivity of $(\Omega^{-1}cm^{-1})$ value of greater than $10^{-13}$ but less than $10^{-1}$, at an initial temperature of between about 20° C. and 70° C., and thereafter at temperature of at least about the crystalline melting point of the polyethylene and continuing the reaction to obtain a stable chlorosulfonated polyethylene elastomer containing 25 to 45 weight percent chlorine and 0.5 to 3 weight percent sulfur.

The inert inorganic compounds include titanium compounds such as titanium dioxide, barium titanate, lead titanate, barium-lead titanate-niobate and the like. Particularly useful are rutile type titanium dioxide and barium titanate. The amounts used will be from 1 to 10 weight parts per 100 weight parts of polyethylene, but larger amounts may be used. The particle sizes will range from about 0.05 to 2 microns. Particularly useful are particles of 0.2±0.05 micron size.

The ratio of chlorine to sulfur dioxide used on a volume basis at standard temperature and pressure (25° C., 01 Mla) may vary from 20:1 to 1:2, preferably 4:1 to 1:1 of chlorine to sulfur dioxide. The reaction is generally continued until the polymers contains as much as 25 to 50, normally to 45 weight percent for elastomers, weight percent chlorine, and this is determined by the change in polymer density, the amount of HCl evolved during the chlorosulfonation process, etc. The ratio may be varied during the course of the reaction, and all of the $SO_2$ may be added in the initial or at a later part of the reaction.

While an inert diluent gas is not necessary, inert gases such as nitrogen, carbon dioxide, hydrogen chloride and the like may be used. Unreacted $SO_2$ and $Cl_2$ may be recycled, and this may include some HCl byproduct which will build up over a period of time. This normally is bled off to keep the concentration in the reactor at a concentration of less than 40% HCl, preferably about 25% to 30% HCl. In the process, minimum amounts of oxygen should be in the feed streams and reactor. The maximum amount of oxygen in the reactor should be below 300 ppm, preferably below 150 ppm. The chlorosulfonation reaction may be started with chlorine and sulfur dioxide at a temperature between about 20° C. and 70° C. and thereafter completing the reaction at a temperature of about 100° to 150° C.

Vapor phase bulk chlorosulfonation of polyethylene is contemplated for a variety of conditions and equipment, both batch and continuous. Any means known to those skilled in the art for vapor phase chlorosulfonation of polyolefins may be used to conduct the reaction, for example, a rotary drum, a moving bed, horizontal stirred reactor, but more preferably in a fluidized bed of the polyethylene. The fluidized bed reaction normally is conducted at about atmospheric pressure and typically at superficial velocities of reactant gases of about 0.2 to 5 feet per second, preferably about 1 to 1.5 feet per second.

Light can be used to initiate the reaction in order to increase the rate of reaction. While light from daylight sources, incandescent bulbs and the like may be used, ultraviolet light is more efficient and this is preferably used initially in the reaction. The reaction can also be initiated by generating free radicals thermally as by decomposition of peroxide or azo catalysts. Thermally generated chlorine radicals are sufficient to initiate the reaction.

At the conclusion of the reaction, the polymer is normally removed from the reactor and the unreacted and byproduct gases are removed as by stripping and purging with nitrogen. The reaction temperature of the polymer is preferably lowered to about 80° C. to 110° C., and the polymer is purged with nitrogen and/or stripped under vacuum to remove most of the unreacted $SO_2$, $Cl_2$ and byproduct HCl. This may be done in the reactor if desired.

The resulting chlorosulfonated polyolefins contain as high as about 25 to about 45 weight percent chlorine, with the optimum being about 35 to 38 weight percent. The sulfur present as $SO_2Cl$, calculated as sulfur, will range from about 0.5 to 3 weight percent, which results in a vulcanizable elastomer that can be cured in many ways, including metal oxide-sulfur cures. The resulting elastomers have a 4 minute ML Mooney value at 100° C. of about 15 to 150, normally about 35 to 120.

In the following example the powdered polyethylene was blended with titanium dioxide or barium titanate as described and charged to a fluid bed reactor and purged with nitrogen. The reactions were started at room temperature by introducing chlorine and sulfur dioxide. The temperature of the bed was increased by heating the reactor with a circulating bath and heating the incoming gases. The bed and reaction temperature was controlled by the temperature of the circulating bath and/or diluting the reactants with nitrogen. The end of the reaction was determined by the total uptake of chlorine required to reach the desired chlorine conent. At the end of the reaction a purge with nitrogen for 30 minutes at about 110° C. degasses the polymer powder to contain less than 200 ppm $SO_2$, preferably less than 100 ppm. The resulting products were white or light tan.

A typical chlorosulfonated polyethylene polymer was prepared as follows:

70 grams of high density polyethylene powder having a density of 0.952, a crystalline melting point of 134° C. by differential scanning calorimetry, a melt index of 0.8 and a particle size of 125–250 microns was dry blended with 2.1 grams of titanium dioxide (rutile, particle size 0.18 microns) and placed in a 2″ diameter glass fluid bed column provided with a heating jacket through which silicon oil was circulated. The fluid bed was connected to a cyclone and further to a caustic scrubber. The fluid bed was provided on the outside with a source of UV light having the main wavelength at 356 nanometers. The powder was fluidized for 30 minutes by passing approximately 10 liters per minute of nitrogen during which time the oxygen was removed. A mixture of 13 liters per minute of chlorine having less than 100 ppm oxygen and 6 liters per minute of sulfur dioxide having less than 100 ppm oxygen was used as both fluidizing and reactive medium. The mixture was admitted into the reactor at room temperature. The temperatures of the fluid bed increased rapidly to 46° C. after which it started to decrease. At this point, heat was provided via the jacket and incoming gases so that the temperature of the bed reached 125° C. within 55 minutes from the start. At this point, the reaction exotherm brought the bed to 133° C. at 60 minutes and to 142° C. at 70 minutes. This temperature was further maintained by proper cooling and/or by temporary change of chlorine to sulfur dioxide ratio. The reaction was stopped at 77 minutes. The course of the reaction was followed by the density of powder samples extracted from the bed. The final product was white and contained 39% chlorine and 2% sulfur (as sulfonyl chloride group). It was completly soluble in toluene at 50° C., (except the inorganic additive) and it has a residual crystallinity below 2%. The polymer had a Mooney value ML 5+4 @ 100° C. ASTM No. D1646) of 120.

In another run, the process was repeated using a high density polyethylene powder having a density of 0.952, a melt index of 4.3, and a particle size of 125–250 microns. The maximum temperature reached as 145° C. and after 72 minutes the product contained 37% chlorine and 1.8% sulfur and had a residual crystallinity as measured by DSC of under 2%. It was completely soluble in toluene at 50° C. The Mooney value was 91.

The materials to be added to or mixed in with the powdered chlorosulfonated polyolefins to eliminate $SO_2$ odor are quite critical and specific. The materials used for dry blending with the powdered vapor-phase chlorosulfonated polyolefins should have low hygroscopicity, have no adverse affect of the physical properties of the chlorosulfonated polyolefin polymer, not cause premature cross-linking of the polymer, and not interfere with the subsequent curing of the polymer.

A number of materials that the man skilled in the art would have predicted that would react with or otherwise have some effect on free sulfur dioxide, were completely ineffective in eliminating or preventing release of sulfur dioxide from the powdered vapor phase chlorosulfonated polyethylenes. These ineffective materials include aluminum oxide, barium oxide, calcium carbonate, calcium hydroxide, magnesium carbonate, potassium citrate, sodium bicarbonate, sodium dihydrogen phosphate, $NaPO_3$, triethanolamine, Epon 826 (bisphenol A-glycidyl ether copolymer) and calcined clay. These materials were all found to be ineffective in preventing the release of sulfur dioxide from powdered chlorosulfonated polyethylene even when mixed with the polymer in amounts of one or more parts per hundred of polymer (phr). In contrast, and quite unexpectedly, magnesium oxide was effective in eliminating sulfur dioxide odor even in amounts as low as 0.05 phr.

Materials that can be used for commercial chlorosulfonated polyolefins by dry blending with the powdered chlorosulfonated polymers must be ones that eliminate the odor and corrosivity accompanying free sulfur dioxide. Further, these materials should be powdered, and while not essential, preferably of a particle size range smaller than that of the powdered polymers, and in any event of weight average particle size ranges from about 0.1 mm to about 100 mm, more preferably from about 0.1 to about 75 mm, otherwise one may obtain settling, layering, have dust problems and the like, all of which may interfere with the efficiency of the materials to reduce sulfur dioxide released from the polymers.

Materials found to be useful for the purpose of the invention include $Mg(OH)_2$, MgO (Maglite D), $Ba(OH)_2$, $BaCO_3$, $Al(OH)_3$, $Na_3PO_4.12H_2O$, $Na_2HPO_4$, $K_2HPO_4$, $Na_2CO_3$, $K_3PO_4$ and $K_2CO_3$. The amounts used may be from about 0.01 weight parts of MgO and $Mg(OH)_2$, about 0.1, 0.5 and 1 weight parts of $Ba(OH)_2$, about 0.5 weight parts of $BaCO_3$ and about 1.0 weight part per 100 weight parts of chlorosulfonated polymer of $Al(OH)_3$, $K_2HPO_4$, $Na_2HPO_4$, $Na_3PO_4.12H_2O$, $K_3PO_4$, $K_2HPO_4$, $K_2CO_3$ and $Na_2CO_3$, to about 3 or more weight parts as required, but the amounts used preferably are the smallest amount needed to accomplish the desired purpose. Of particular value and utility is magnesium oxide. Quite unexpectedly, magnesium oxide is useful in amounts as low as greater than about 0.01 weight parts per one hundred weight parts of polymers and may be used in amounts up to one or more weight parts, if desired, but large amounts are not necessary, less than one phr normally being sufficient. Magnesium oxide is particularly valuable since it is often used in larger amounts to vulcanize the chlorosulfonated polyethylene, for example in amounts from about 10, and as much as 20 weight parts or more per one hundred weight parts of polymer.

In the following examples, samples of vapor phase chlorosulfonated polyethylene polymer in powder form, purged with nitrogen, and containing about 100 to 200 ppm of residual $SO_2$, were mixed with a number of powdered inorganic materials and placed in airtight containers along with pieces of $SO_2$ test paper. The test paper was prepared by soaking potassium iodide-starch paper in a solution of Iodine in methanol and drying in air. The $SO_2$ test paper had a purple color, and turns white in the presence of $SO_2$. Control examples of polymer not containing the inorganic additives showed the beginning of a test paper color change in about 15 to 30 minutes, demonstrating the presence of $SO_2$. In the examples where the color of the paper did not change and retained the initial purple color for a number of days, and weeks, there was no detectable odor of $SO_2$ in the polymer when the test containers were opened.

In samples containing 1 weight part of MgO, $BaCO_3$, $Al(OH)_3$, $Na_2HPO_4$ and $Na_2CO_3$, the test paper was still purple after 30 days, showing that there was no $SO_2$ present. Samples with 0.05 MgO and 0.5 $BaCO_3$ also were still effective after more than 30 days in the sealed containers. As little as 0.05 weight part of MgO and 0.5 weight part of barium carbonate were effective for more than 30 days, i.e., for an indefinite period. In another series of tests, 0.05 weight part of $Mg(OH)_2$, 0.1 and 0.5 weight part of $Ba(OH)_2$ and 1.0 weight part of $Na_3.12H_2O$ were found to be effective odor reducers.

In the samples containing 1 weight part of $Ca(OH)_2$, $NaH_2PO_4$, $NaHCO_3$, $Al_2O_3$, $CaCO_3$, $MgCO_3$, potassium citrate, triethanol amine, BaO, $NaPO_3$, calcined clay and Epon 826, the test paper turned white after only a few hours, demonstrating the evolution of and presence of $SO_2$, and the surprising ineffectiveness of these materials.

We claim:

1. A method for eliminating the sulfur dioxide odor of vapor phase chlorosulfonated polyolefins comprising mixing with vapor phase chlorosulfonated polyolefins containing less than 300 ppm of free sulfur dioxide, less than 2 weight parts per 100 weight parts of polyolefin, of stabilizing amounts of inorganic additives selected from the group consisting of aluminum hydroxide, barium carbonate, barium hydroxide, magnesium hydroxide, magnesium oxide, potassium phosphate, sodium carbonate, disodium hydrogen phosphate and trisodium phosphate.

2. A method of claim 1 wherein said poloyolefin is polyethylene.

3. A method of claim 2 wherein said chlorosulfonated polyethylene has a particle size range of from about 50 to 1000 microns, and contains about 10 to 50 weight percent bound chlorine and 0.1 to about 3 weight percent bound sulfur dioxide.

4. A method of claim 3 wherein the inorganic additive is magnesium oxide in amounts greater than 0.01 weight parts per 100 weight parts of the chlorosulfonated polyethylene.

5. A method of claim 3 wherein the inorganic additive is aluminum hydroxide in amounts of at least about 1 weight part per 100 weight parts of the chlorosulfonated polyethylene.

6. A method of claim 3 wherein the inorganic additive is disodium hydrogen phosphate in amounts of at least about 1 weight part per 100 weight parts of the chlorosulfonated polyethylene.

7. A method of claim 3 wherein the inorganic additive is sodium carbonate in amounts of at least about 1 weight part per 100 weight parts of the chlorosulfonated polyethylene.

8. A method of claim 3 wherein the inorganic additive is barium carbonate in amounts of at least about 0.5 weight parts per 100 weight parts of the chlorosulfonated polyethylene.

9. A method of claim 3 wherein the inorganic additive is magnesium hydroxide in amounts greater than 0.01 weight parts per 100 weight parts of the chlorosulfonated polyethylene.

10. A method of claim 3 wherein the inorganic additive is barium hydroxide in amounts of at least about 0.1 weight part per 100 weight parts of the chlorosulfonated polyethylene.

11. A method of claim 3 wherein the inorganic additive is trisodium phosphate in amount of at least about 1 weight part per 100 weight parts of the chlorosulfonated polyethylene.

12. A method of claim 3 wherein the inorganic additive is potassium carbonate in amounts of at least about 1 weight part per 100 weight parts of the chlorosulfonated polyethylene.

13. A method of claim 3 wherein the inorganic additive is tripotassium phosphate in amounts of at least about 0.5 weight parts per 100 weight parts of the chlorosulfonated polyethylene.

14. A method of claim 3 wherein the inorganic additive is disodium hydrogen phosphate in amounts of at least about 1 weight part 100 weight parts of the chlorosulfonated polyethylene.

15. A method of claim 4 wherein the polyethylene particle size range is from about 100 to 600 microns, and it contains less than 200 ppm of free sulfur dioxide, and the MgO is present in amounts of less than one weight part per 100 weight parts of said polyethylene.

16. A method of claim 2 wherein said polyolefin is an ethylene copolymer.

* * * * *